United States Patent [19]
Alexander et al.

[11] Patent Number: 5,983,271
[45] Date of Patent: Nov. 9, 1999

[54] METHOD FOR PROCESSING ASYNCHRONOUS LOW-LEVEL PROTOCOLS IN A COMMUNICATION DEVICE TO OFF LOAD THE MAIN PROCESSOR

[75] Inventors: J. Scott Alexander, Court Palm Harbor; Joseph Q. Chapman, Seminole, both of Fla.; P. Michael Henderson, Tustin, Calif.; Edward Thoenes, St. Petersburg, Fla.

[73] Assignee: Paradyne Corporation, Largo, Fla.

[21] Appl. No.: 08/796,670

[22] Filed: Feb. 6, 1997

[51] Int. Cl.⁶ .................................................. G06F 13/00
[52] U.S. Cl. ........................................... 709/227; 375/222
[58] Field of Search ........................... 395/200.6, 200.66, 395/200.38, 200.43; 375/222, 370, 377; 370/230; 379/93.31, 93.28; 709/200, 201, 212, 213, 217, 219, 227, 228

[56] References Cited

U.S. PATENT DOCUMENTS

| | | | |
|---|---|---|---|
| 4,831,648 | 5/1989 | Nishino | 379/93.04 |
| 5,115,432 | 5/1992 | Haas | 370/94.1 |
| 5,134,611 | 7/1992 | Steinka et al. | 375/216 |
| 5,163,054 | 11/1992 | Nagy | 395/200.6 |
| 5,268,928 | 12/1993 | Herh et al. | 375/222 |
| 5,299,193 | 3/1994 | Szczpanek | 370/463 |
| 5,339,355 | 8/1994 | Mori et al. | 370/294 |
| 5,598,410 | 1/1997 | Stone | 370/469 |
| 5,761,602 | 6/1998 | Wagner et al. | 455/3.1 |
| 5,793,803 | 8/1998 | Barnes | 375/222 |
| 5,881,102 | 3/1999 | Samson | 375/222 |

*Primary Examiner*—Moustafa M. Meky
*Attorney, Agent, or Firm*—Thomas, Kayden, Horstemeyer & Risley L.L.P.

[57] ABSTRACT

The present invention provides a method and apparatus for multi-protocol, point-to-point communications which allocates processing tasks between a processor of an end point device and a processor of a communication device. The processor of the end point device performs all higher level protocol processing and the processor of the communication device performs lower level protocol processing. Internet service providers usually have several modems connected to each host computer for providing simultaneous point-to-point communication with a plurality of end users. The modems normally are located on cards which reside inside of the host computer, which may be a personal computer. To prevent the host processor from having to perform all of the protocol processing tasks for each session, the present invention provides for off-loading at least a portion of the Point-to-Point Protocol processing onto the modem processors. The host and the communication device or devices are interfaced via a shared memory device. This increases throughput and leaves the host processor free to perform other tasks. Preferably, the modem processors perform the portion of Point-to-Point Protocol processing which includes framing and unframing, Frame Check Sequence generation and checking and shielding and unshielding.

9 Claims, 3 Drawing Sheets

METHOD FOR PROCESSING ASYNCHRONOUS LOW-LEVEL PROTOCOLS IN A COMMUNICATION DEVICE TO OFF LOAD THE MAIN PROCESSOR

TECHNICAL FIELD OF THE INVENTION

The present invention relates to a method and apparatus for allocating processing tasks between a communication device processor and an end point device processor and, more particularly, to a method and apparatus for use in communications which utilizes the communication device processor for performing lower level protocol processing and which utilizes the end point device processor for performing higher level protocol processing, thus splitting the protocol processing tasks between the communication device processor and the end point device processor.

BACKGROUND OF THE INVENTION

In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC). Layer 2, the datalink layer, generally fragments the data to prepare it to be sent on the physical layer, receives acknowledgment frames, performs error checking, and retransmits frames which have been incorrectly received.

Layer 3, the network layer, generally controls the routing of packets of data from the sender to the receiver via the datalink layer. It is used by the transport layer. An example of the network layer is Internet Protocol (IP) which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols. The transport layer (Layer 4) determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues. Layer 6, the presentation layer, attempts to minimize the noticeability of differences between hosts and performs functions such as text compression and format and code conversion. Layer 7, the presentation layer, is used by the application layer to provide the user with a localized representation of data which is independent of the format used on the network. The application layer is concerned with the user's view of the network and generally deals with resource allocation, network transparency and problem partitioning.

The Point-to-Point Protocol (PPP) generally encompasses the datalink layer (layer 2) and the network layer (layer 3) of the OSI model. PPP was designed to provide a standard Internet encapsulation protocol for transmitting multiprotocol datagrams over point-to-point links. PPP has three main components, namely, (1) an encapsulation method (HDLC-like), (2) a link control protocol (LCP) for establishing, configuring and testing the datalink connection, and (3) a family of network control protocols (NCPs) for establishing and configuring different network layer protocols. PPP using HDLC-like framing is defined in Request For Comments (RFC) 1662. PPP is capable of operating over most data terminal equipment/data communication equipment (DTE/DCE) interfaces (e.g., EIA RS-232-E, EIA RS-422 and CCITT V.35). PPP requires a dedicated or switched full-duplex circuit which can operate in either asynchronous, bit-synchronous or octet-synchronous mode and which is transparent to the datalink layer frames. PPP presents an octet interface to the physical layer and makes no provisions for accepting sub-octets. PPP accommodates several different network layer protocols, such as Internet Protocol (IP), Internetwork Packet Exchange (IPX), DECnet, etc.

Most remote local area network access and Internet access is performed using asynchronous communications across a modem or across an ISDN terminal adapter (TA). However, the higher level layers, IP or TCP/IP, are block-oriented and normally require a synchronous protocol for transmission. In order to transmit these higher level layers over asynchronous communication links, low level protocols, such as PPP, have been developed. These lower level protocols present a significant processing load to the end point device processor because of the character-intensive nature of the protocols. In the past, the end point device processor has been made responsible for all PPP processing. End point devices, such as personal computers, used by Internet service providers should each be capable of simultaneously servicing several users in order to maximize efficiency. Therefore, each end point device of the Internet service provider normally includes several modems for simultaneous communication with a plurality of users. The modems usually are located on cards which reside inside of the end point device. This arrangement requires that the host processor of each end point device perform the protocol processing, including PPP processing, for a plurality of users. The processing of the lower level protocols, such as PPP, takes up a large amount of the processing time of the end point device processor which could be used by the end point device processor to perform other processing tasks.

In accordance with the present invention, the processing of the lower level protocols is accomplished by the processor of the communication device, thus increasing throughput and leaving the processor of the end point device free to handle other tasks.

SUMMARY OF THE INVENTION

The present invention provides a method and apparatus for allocating processing tasks between an end point device processor and a communication device processor wherein the higher level protocols are processed by the processor of the end point device and the lower level protocols are processed by the processor of the communication device. In accordance with the preferred embodiment of the present invention, the processor of the communication device performs framing, frame check sequence (FCS) generation and checking, and generation of and stripping of the shielding characters. IP processing and, if necessary, TCP processing, is performed by the processor of the end point device. Processing of higher level protocols preferably is performed by the processor of the end point device. Communication between the communication device and the end point device preferably is accomplished via shared memory or via a synchronous bit-oriented communication link utilizing a protocol such as HDLC (High Level Datalink Control). By utilizing shared memory for communication between the end point device processor and the communication device processor rather than, for example, a communication link which utilizes HDLC, some of the processing tasks are off-loaded from the end point device processor.

In accordance with a first embodiment of the present invention, the end point device is a personal computer and the communication device is a modem. The processor of the modem performs packet framing, shielding and unshielding of the escape characters and FCS generation and checking. The PC processor performs the remainder of the PPP processing and all higher level protocol processing, including link control protocol (LCP) processing and network control protocol (NCP) processing.

In accordance with the preferred embodiment of the present invention, the PC is coupled via an interface to a plurality of modems for providing simultaneous point-to-point communications with a plurality of end users. The processor of the PC communicates with each of the modem processors to split the PPP processing between the modem processors and the PC processor in the manner stated above. Specifically, the modem processors perform framing and unframing, FCS generation and checking, and shielding and unshielding of escape characters. The host processor performs the remainder of the PPP processing and all higher level protocol processing, such as TCP/IP processing. By splitting the PPP processing in this manner, some of the processing is off-loaded from the PC processor to the modem processors, thus increasing throughput and freeing the PC processor to perform other processing tasks. In order to facilitate communication between the host processor and the modem processors, preferably the PC processor communicates with a master control processor (MCP) which communicates with each modem processor, which function as slave control processors (SCPs). The SCPs perform packet framing and unframing, shielding and unshielding of escape characters and FCS generation and checking. The PC processor preferably performs all other protocol processing tasks. In accordance with this embodiment, the MCP forms an interface between the PC processor and the MCP and between the MCP and the SCPs to provide data transfer between the SCPs and the PC processor.

Accordingly, it is an object of the present invention to provide a method and apparatus for multi-protocol, point-to-point communications which provides increased throughput.

It is yet another object of the present invention to provide a method and apparatus for multi-protocol, point-to-point communications which implements the Point-to-Point Protocol (PPP).

It is yet another object of the present invention to provide a method and apparatus for multi-protocol, point-to-point communications which splits PPP processing tasks between an end point device processor and a communication device processor.

It is another object of the present invention to provide a method and apparatus which can be incorporated into an Internet service provider's system for multi-protocol, point-to-point communications between the Internet service provider and end users which provides increased throughput.

It is yet another object of the present invention to provide a multi-protocol, point-to-point communication system which implements PPP and which comprises a host central processing unit (CPU) and a plurality of modem processors wherein the modem processors perform packet framing, FCS generation and checking and shielding and unshielding of escape characters and the CPU performs the remainder of the PPP processing and all other higher level protocol processing.

It is yet another object of the present invention to provide a method and apparatus for multi-protocol, point-to-point communications which is cost-effective.

These and other objects of the present invention will become apparent from the following description, drawings and claims.

DETAILED DESCRIPTION OF THE INVENTION

Figure 1:
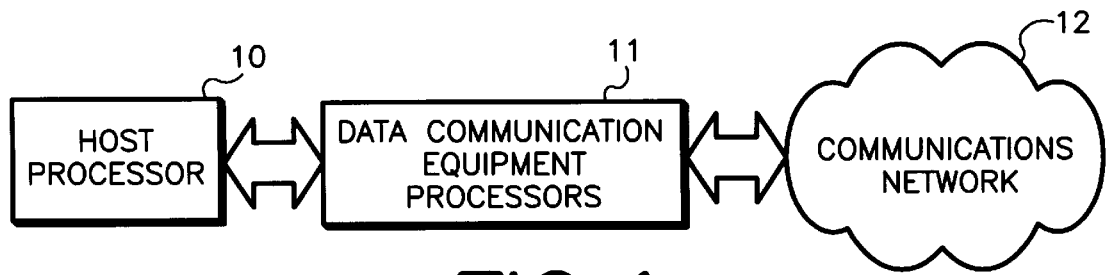
FIG. 1 is a block diagram of the present invention in accordance with a first embodiment.

FIG. 1 is a block diagram generally illustrating the method and apparatus of the present invention. The method and apparatus of the present invention provides a system for multi-protocol, point-to-point communication which splits the PPP processing between a host processor and a modem processor so that some of the PPP processing is off-loaded from the host processor, thus freeing the host processor to perform other tasks. This is particularly advantageous when the host processor performs PPP processing for simultaneous communication with a plurality of end users, as is the case with Internet service providers. Therefore, in the interest of brevity, the present invention will only be discussed with respect to its use for providing multi-protocol, point-to-point communication with a plurality of end users simultaneously, which is the preferred embodiment of the present invention. However, it will be apparent to those skilled in the art that the present invention can be accomplished with only one host processor and only one communication device (e.g., modem) processor, although the benefits of the present invention will be greater when it is implemented in its preferred form.

As shown in FIG. 1, a host processor 10 communicates with a plurality of modem processors 11 which are connected to a communications network 12, such as, for example, the Public Switched Telephone Network (PSTN). In accordance with the preferred embodiment, the PPP processing is split between the host processor 10 and the modem processors 11. Preferably, each modem processor performs framing and unframing, Frame Check Sequence (FCS) checking and generation, and shielding and unshielding of the escape characters. The remaining PPP processing is performed by the host processor 10.

Figure 2:
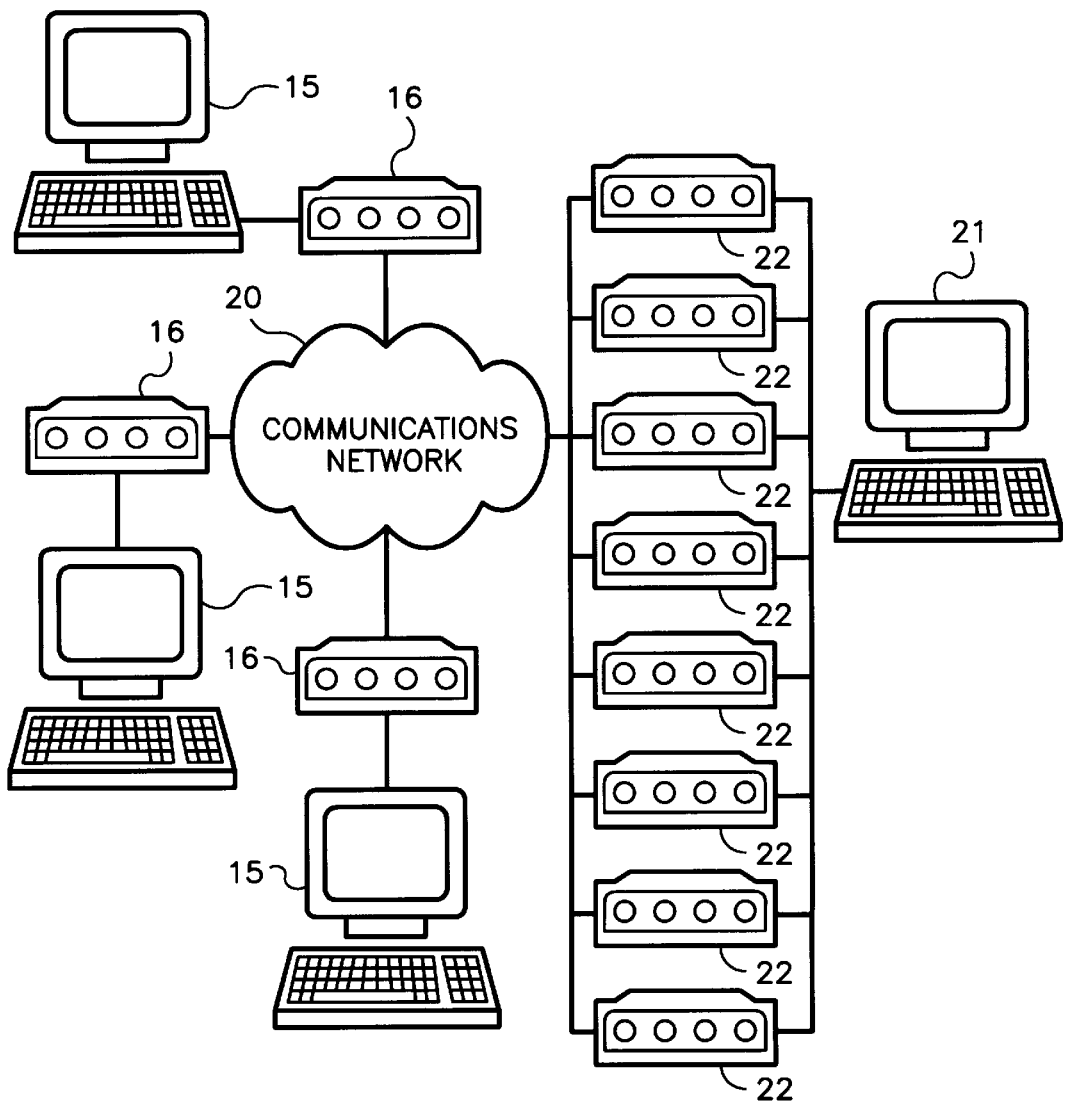
FIG. 2 is a block diagram of the present invention in accordance with the preferred embodiment.

FIG. 2 is a block diagram of the preferred embodiment of the present invention wherein the present invention is implemented as part of an Internet service provider system and is connected to the network 20. End users having data terminal equipment 15, such as personal computers, and data communication equipment 16, such as modems or terminal adapters, are connected to the network 20. A portion of an Internet service provider system is shown which includes a PC 21 having a host processor (not shown) and several modems 22 which are connected to the communications network 20, which in this case is the PSTN. Each of the modems 22 contains a processor (not shown), such as a Motorola 68302. The PC 21 also contains a processor, such as an Intel Pentium™ microprocessor. For illustrative purposes, the modems 22 are depicted as being outside of PC 21. As stated above, the modems 22 will normally be arranged on a card inside of the PC 21.

Figure 3:
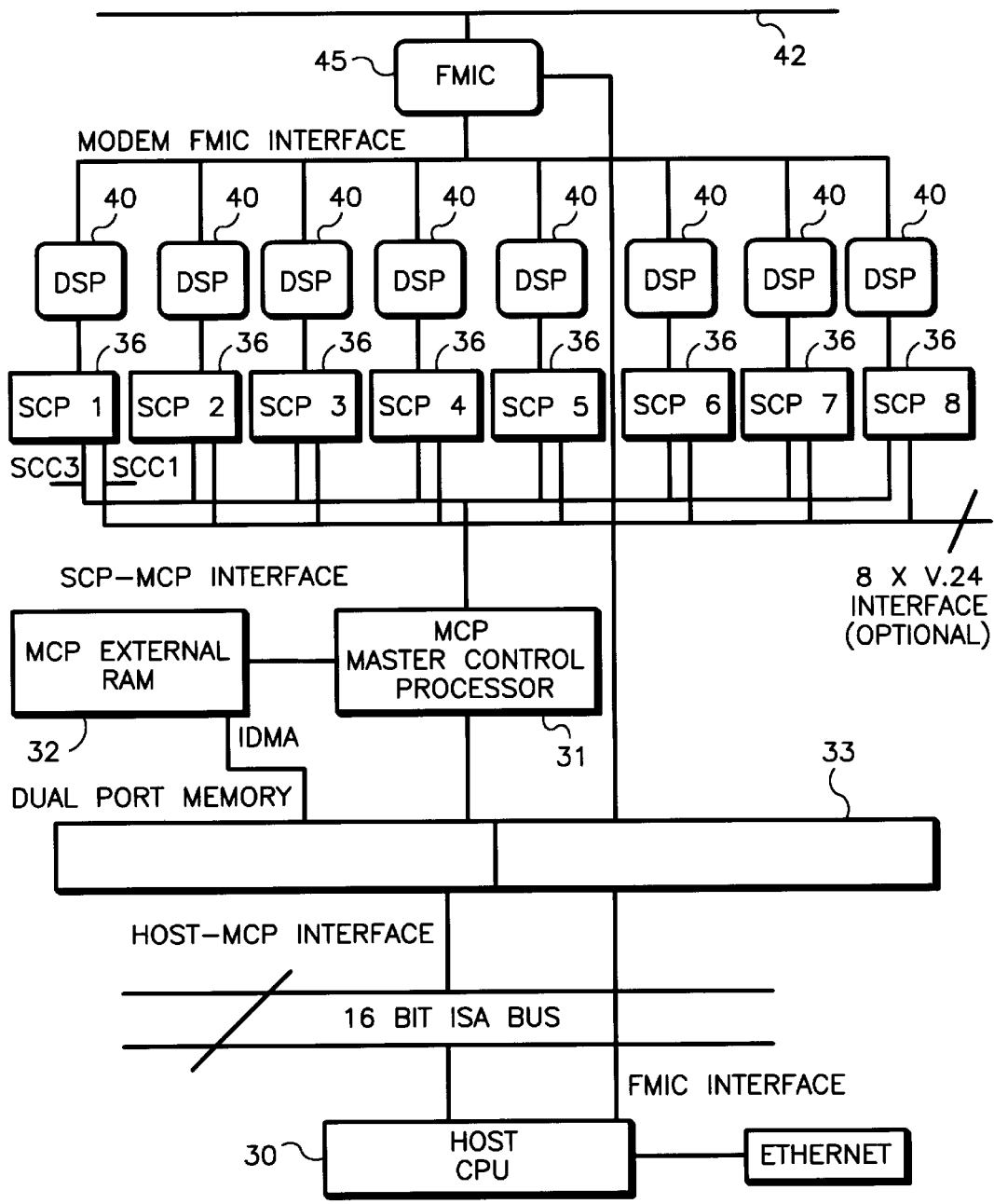
FIG. 3 is a block diagram illustrating an example of how the present invention may be implemented.

FIG. 3 is a block diagram illustrating an example of how the present invention may be implemented. The host CPU 30 interfaces with a master control processor 31 via shared dual port random access memory 33. Each of the modems comprises a slave control processor (SCP) 36 and a digital signal processor (DSP) 40. In accordance with this embodiment, eight modems are shown as representing, for example, a modem bank of an Internet service provider. However, it will be apparent to those skilled in the art that the present invention is not limited with respect to the number of modems which can be implemented. The outputs of the DSPs are connected to a Multi-Vendor Interface Protocol (MVIP) 42 bus via Flexible Memory Interface Chip (FMIC) 45. The FMIC 45 is connected to a T1 (not shown) which provides 24 64 kbps channels and which is connected to the PSTN. FMIC 45 interfaces with the host processor 30 via shared dual port memory 33. FMIC 45 is configured by the host 30. Its function is to switch the 64 kbps channels onto and off of the MVIP bus 45. Optimally, one T1 card will be allocated for every 24 modems to provide an interface between the T1 and each modem card. External RAM 32 stores instructions for MCP 31 and provides an interface for transferring data from the SCPs 36 through the MCP 31 to memory 33 and to the host 30, and vice versa. In accordance with the preferred embodiment, internal direct memory access (IDMA) is used to transfer data between external RAM 32 and shared dual port memory 33.

It should be noted that although the present invention has been described in detail with respect to its use with modems, the present invention is equally applicable to terminal adapters, which are end point devices used for transmission over the Integrated Services Digital Network (ISDN). In that case, the terminal adapters will be interfaced with the host processor via shared random access memory in a manner similar to that discussed above with reference to FIG. 3. By utilizing shared memory in this manner, increased throughput can be realized and more of the lower level protocol processing can be performed by the terminal adapters. It should also be noted that the term communications network is intended to include analog and digital network circuits, PSTN, ISDN, Wireless, DSL and any other type of arrangement that requires a PPP session.

Figure 4:
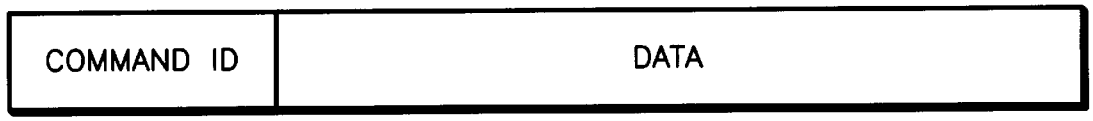
FIG. 4 depicts the message structure for all messages sent between the host processor and the master control processor in accordance with the embodiment of FIG. 3.

Since PPP is well known in the art, in the interest of brevity, only the manner in which the PPP processing is split and the commands for accomplishing the split in accordance with the present invention will be discussed here. A portion of the shared dual port memory 33 will be used exclusively for communication between the host processor 30 and the MCP 31. The commands to and from the MCP 31 to and from the host processor 30 will have the structure shown in FIG. 4. The first field is the command ID byte. Each command and the response to that command will have the same command ID value. The data field will contain parameters for the commands and the responses. Multiple commands can be contained in the dual port memory at the same time. The following commands are utilized to provide the PPP split. The host processor 30 sends a configured FCS size command for each PPP session. The MCP 31 sends a response to the setting of the FCS command to the host processor 30. The host processor 30 requests the largest space available in the dual port memory so that the size of the Maximum Receiving Unit (MRU) that can be sent or received can be determined. The MCP 31 sends the value of the largest MRU that can be stored in the dual port memory data buffers when they have no data in them. The MRU is the maximum data in a PPP packet minus the protocol byte or bytes. The default size for the MRU is 1500 bytes.

Figure 5:
FIG. 5 illustrates the HDLC-like framing for the frames sent between the master control processor and the slave control processors in accordance with the embodiment of FIG. 3.

The frame structure for the messages to be transmitted between the MCP 31 and the slave control processors (SCPs) 36 is shown in FIG. 5. The SCP/MCP interface preferably uses HDLC-like framing, as defined in, for example, RFC 1662. The flag, address, control and CRC fields are standard HDLC fields and, therefore, a discussion of these fields will not be provided here. The channel type field provides separate logical channels between the MCP 31 and each of the SCPs 36. One of the channel types defined by the channel type field will be PPP data. When defining PPP data, this field specifies a PPP start frame, PPP data, a PPP end frame, and a PPP start-and-end frame. These fields are used in this embodiment to avoid having to send data transparency, i.e., shielding and unshielding of escape characters, across the MCP/SCPs interface. The PPP start frame byte signals that the first byte in the frame is the beginning of a PPP frame. The first byte will always be the PPP flag byte, 0×7E. The PPP data byte signals that all of the data in the frame belongs to the PPP frame that was started with the last PPP start frame byte. The PPP end frame byte signals that this is the last data in the PPP frame that began with the PPP start frame byte. The PPP start-and-end frame byte signals that the entire PPP frame is contained within the frame being sent. Whenever the channel type is of the type dealing with PPP, the data field will contain all or some part of a PPP frame and will contain a PPP packet within it. This frame will have a beginning and ending flag and the HDLC-like framing between the flags.

The functions of the host processor, the MCP and the SCPs will now be described with reference to the embodiment illustrated in FIG. 3. In accordance with this embodiment, the SCPs perform FCS generation and checking, HDLC-like framing and unframing and shielding and unshielding of escape characters. The host processor delivers PPP packets to the MCP via shared dual port memory 33 (See FIG. 3). The block of data has a word header containing a byte count with the most significant bit set informing the MCP that the block of data is a PPP packet. The MCP then sends the data to the appropriate SCP. The SCP then adds HDLC-like framing to the packet. The SCP then calculates the FCS based on the configuration of the frame and appends the FCS to the frame. The SCP then adds a beginning and ending flag to the frame. The PPP frame is then transmitted to the PSTN.

In order to transmit the data over the MCP/SCPs interface, the data preferably is transmitted in HDLC-like format from the MCP to the SCPs, and vice versa, in the manner discussed above with respect to FIG. 5. However, it should be noted that this has nothing to do with the PPP processing split of the present invention. This is merely the preferred manner of communicating data between the MCP and the SCPs and allows the system shown in FIG. 3 to conveniently handle data of types other than PPP, which types will be specified by the channel type field shown in FIG. 5. It should be noted that the present invention is not limited in any way with respect to the manner in which the data is communicated between the MCP and the SCPs.

When the data is transmitted in this manner across the MCP/SCPs interface, the frames may be broken up to send them across the MCP/SCPs interface because the largest default packet size is 1500 bytes whereas the largest frame passed across the MCP/SCPs interface preferably is 256 bytes. The channel type byte of the HDLC frame delineates the beginning and ending of the HDLC-like framed PPP packets.

In addition to PPP framing and unframing and FCS generation and checking, the destination SCP shields all data between the beginning and ending flag bytes using the Async Control character Map (ACCM) sent from the host processor. The ACCM shielding indicates to the receiver of the data that characters other than the escape character and the flag character (which always must be escaped) need escaping. This shielding can be briefly explained with the following example. Certain bytes within the HDLC-like frame have certain characters, such as the flag byte which is always 0x7E. Whenever this character is used for something other than the flag byte, it must be shielded by complementing the fifth bit position and by adding 0x7D to the front of the byte, as stated in RFC 1662. Once the shielding is completed, the frame is sent to the PSTN.

In the network-to-host direction, when the host processor sets an SCP in the PPP mode, the SCP begins looking for the beginning flag of the PPP frame. When the beginning flag is found, the frame is checked for the escape characters and for characters below 0x20. If the escape character is found, it is removed and the following character has its fifth bit complemented. If a character is found with a value below 0x20, then the ACCM character is checked. If this character is mapped, then it is discarded. Otherwise, this character is kept. The frames are then sent across the MCP/SCPs interface to the MCP with the appropriate channel type byte in the manner discussed above.

Although the present invention has been described with respect to a particular implementation which utilizes a master control processor to communicate with a plurality of modem processors, it should be noted that this arrangement is not necessary for the successful implementation of the present invention. This is simply an example of one way of carrying out the present invention. It will be apparent to those skilled in the art in view of the present application that all that is required for the successful implementation of the present invention is some means for enabling the modems to carry out a portion of the PPP processing and some means for enabling the end point device to carry out a portion of the PPP processing.

It will be apparent to those skilled in the art in view of the discussion provided herein that the present invention is not limited with respect to the portions of the PPP processing to be divided between the host processor and the modem processors. It should also be noted that the present invention is not limited to PPP processing. The processing of other protocols may also be split between the host processor and the modem processor. For example, lower level protocols other than PPP may be processed in accordance with the present invention to off-load some of the processing tasks from the host processor. It may also be desirable to split some of the higher level protocol processing between the host processor and the modem processors. It should also be noted that the present invention has been described with respect to the preferred embodiments but that the present invention is not limited to these embodiments. It will be apparent to those skilled in the art that other modifications may be made to the present invention which are within the spirit and scope of the present invention.

What is claimed is:

1. A system for providing point-to-point communications between said system and end users who are electrically coupled to a communications network, said system comprising:

data terminal equipment comprising a processing unit for processing information;

a memory device electrically coupled to said data terminal equipment;

first data communication equipment electrically coupled to said memory device, wherein said memory device provides an interface between said data terminal equipment and said data first data communication equipment, said first data communication equipment comprising a processing unit for processing information, wherein said first data communication equipment is electrically coupled to the communications network and wherein said processing unit of said data terminal equipment performs a portion of Point-to-Point Protocol processing, wherein said processing unit of said first data communication equipment performs a portion of Point-to-Point Protocol processing and wherein the portion of Point-to-Point Protocol processing performed by said processing unit of said first data communication equipment includes Point-to-Point Protocol framing and unframing, shielding and unshielding of characters, and Frame Check Sequence generation and checking.

2. The system of claim 1 wherein the data terminal equipment is a personal computer and wherein said first data communication equipment is a modem.

3. The system of claim 1 further comprising second data communication equipment, said second data communication equipment comprising a processing unit for processing information, wherein said second data communication equipment is electrically coupled to said memory device and to the communications network, wherein said memory device provides an interface between said second data communication equipment and said data terminal equipment, and wherein said processing unit of said second data communication equipment performs at least a portion of Point-to-Point Protocol processing.

4. The system of claim 3 wherein said first and second data communication equipment are modems and wherein said data terminal equipment is a personal computer.

5. A system electrically coupled to a communications network for providing point-to-point communications between end users who are electrically coupled to the communications network via respective end-user modems, said system comprising:

a computer comprising a central processing unit for processing information;

a memory device electrically coupled to said computer;

a first modem electrically coupled to said computer via said memory device for communicating with a first end user, said first modem comprising a processing unit for processing information, wherein said first modem is electrically coupled to the communications network wherein said central processing unit of said computer performs a portion of Point-to-Point Protocol processing and wherein said processing unit of said first modem performs a portion of Point-to-Point Protocol processing; and a second modem electrically coupled to said computer via said memory device for communicating with a second end user, said second modem comprising a processing unit for processing information, wherein said second modem is electrically coupled to the communications network and wherein said processing unit of said second modem performs a portion of Point-to-Point protocol processing, wherein the portions of Point-to-Point Protocol processing performed by said first and second modems include framing and unframing, shielding and unshielding of characters, and Frame Check Sequence generation and checking.

6. A system electrically coupled to a communications network for providing point-to-point communications between end users who are electrically coupled to the communications network, said system comprising:

a computer comprising a central processing unit for processing information;

a memory device electrically coupled to said computer;

a first modem electrically coupled to said computer via said memory device for communicating with a first end user, said first modem comprising a processing unit for processing information, wherein said first modem is electrically coupled to the communications network and wherein said central processing unit of said computer performs higher level protocol processing, including link control protocol processing and network control protocol processing, and wherein said processing unit of said first modem performs Point-to-Point Protocol processing including framing and unframing, Frame Check Sequence generation and checking, and shielding and unshielding of characters; and a second modem electrically coupled to said computer via said memory device for communicating with a second end user, said second modem comprising a processing unit for processing information, wherein said second modem is electrically coupled to the communications network and wherein said processing unit of said second modem performs Point-to-Point Protocol processing including framing and unframing, Frame Check Sequence generation and checking, and shielding and unshielding of characters.

7. A method for providing point-to-point communications comprising the steps of:

splitting Point-to-Point Protocol processing between a central processing unit of a computer and a processing unit of a data communications device, wherein the data communications device is electrically coupled to the computer via a memory device, wherein the memory device provides an interface between said computer and said data communications device, wherein the processing unit of the computer is utilized to perform a portion of Point-to-Point Protocol processing, wherein the processing unit of the data communications device is utilized to perform a portion of Point-to-Point Protocol processing, and wherein the data communications device is a modem having a processing unit and wherein the processing unit of the modem performs the portion of Point-to-Point Protocol processing including framing and unframing, Frame Check Sequence generation and checking, and shielding and unshielding of characters.

8. A method for providing point-to-point communications with increased throughput by splitting protocol processing between a central processing unit of a computer and processing units of first and second modems, wherein said modems are electrically coupled to said computer via a memory device, and wherein said first and second modems are electrically coupled to the Public Switched Telephone Network, said method comprising the steps of:

utilizing the central processing unit of said computer to perform a portion of Point-to-Point Protocol processing;

utilizing the processing unit of the first modem to perform a portion of Point-to-Point Protocol processing for a first Point-to-Point Protocol session over the Public Switched Telephone Network; and utilizing the processing unit of the second modem to perform a portion of Point-to-Point Protocol processing for a second Point-to-Point Protocol session over the Public Switched Telephone Network, wherein the processing units of the first and second modems each perform the portion of Point-to-Point Protocol processing which includes framing and unframing, Frame Check Sequence generation and checking, and shielding and unshielding of characters.

9. A method for providing point-to-point communications with increased throughput by splitting protocol processing between a processing unit of a computer and processing units of first and second modems, wherein said first and second modems are electrically coupled to said computer via a memory device, and wherein said first and second modems are electrically coupled to the Public Switched Telephone Network, said method comprising the steps of:

utilizing the central processing unit of said computer to perform a portion of Point-to-Point Protocol processing;

utilizing the processing unit of the first modem to perform a portion of Point-to-Point Protocol processing for a first Point-to-Point Protocol session over the Public Switched Telephone Network, wherein the portion of Point-to-Point Protocol processing performed by said processing unit of said first modem includes framing and unframing, Frame Check Sequence generation and checking, and shielding and unshielding of characters; and utilizing the processing unit of the second modem to perform a portion of Point-to-Point Protocol processing for a second Point-to-Point Protocol session over the Public Switched Telephone Network, wherein the portion of Point-to-Point Protocol processing performed by said processing unit of said second modem includes framing and unframing, Frame Check Sequence generation and checking, and shielding and unshielding of characters.

* * * * *